United States Patent
Iwashita et al.

(10) Patent No.: US 6,270,874 B1
(45) Date of Patent: Aug. 7, 2001

(54) POLYETHYLENE TEREPHTHALATE RESIN-COATED METAL PLATE OF HIGH PROCESSABILITY

(75) Inventors: Hiroyuki Iwashita; Fumiko Gotoh; Atsuo Tanaka, all of Yamaguchi-ken (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 09/171,120

(22) PCT Filed: Apr. 10, 1997

(86) PCT No.: PCT/JP97/01241

§ 371 Date: Dec. 8, 1998

§ 102(e) Date: Dec. 8, 1998

(87) PCT Pub. No.: WO97/37845

PCT Pub. Date: Oct. 16, 1997

(30) Foreign Application Priority Data

Apr. 10, 1996 (JP) .................................... 8-112126

(51) Int. Cl.$^7$ ........................................ B32B 5/00
(52) U.S. Cl. .................... 428/98; 428/458; 428/480; 428/623; 428/626
(58) Field of Search ................ 428/98, 458, 480, 428/623, 626

(56) References Cited

U.S. PATENT DOCUMENTS 4,362,775 * 12/1982 Yabe ..................................... 428/213
5,900,325 * 5/1999 Okamura .............................. 428/623

FOREIGN PATENT DOCUMENTS 5-269920 10/1993 (JP) .
6-320669 11/1994 (JP) .

* cited by examiner

Primary Examiner—Nasser Ahmad
(74) Attorney, Agent, or Firm—Browdy and Neimark

(57) ABSTRACT

The present invention produces a polyethylene terephthalate resin covered metal sheet having extremely excellent formability, which can be available for uses in which severe forming is practiced such as drawing, drawing and ironing and drawn and stretch forming as well as the composite forming consisting of drawn and stretch forming followed by ironing. A biaxially oriented film consisting of polyethylene terephthalate resin having a low temperature crystallization temperature ranging from 130° C. to 165° C. is covered at least on one side of a metal sheet by heat bonding in the way that the biaxial orientation of the film of the polyethylene terephthalate resin after being covered is gradually increasing from the contacting portion of the film to the metal sheet to the surface portion of the film.

8 Claims, No Drawings

POLYETHYLENE TEREPHTHALATE RESIN-COATED METAL PLATE OF HIGH PROCESSABILITY

TECHNOLOGICAL FIELD

The present invention relates to polyethylene terephthalate resin covered metal sheet having remarkably excellent formability, which is applicable to heavily formed use such as drawing, drawing and ironing, drawing and stretch forming, and ironing after drawing and stretch forming.

BACKGROUND OF INVENTION

Metal containers such as beverage can or battery container are formed by drawing, drawing and ironing, drawing and stretch forming, or ironing after drawing and stretch forming with the object of material reduction and extension of inside measurement by reduction of wall thickness of container. These metal containers are generally coated inside to give corrosion resistance for content and printed after being coated outside to show content. However, a metal sheet previously covered with organic resin is tried to apply to above-mentioned heavily formed use with a view to reduce coating cost and to eliminate environmental pollution caused by dispersing of solvent during coating operation. And cans formed of metal sheet covered with organic resin has already been placed on sale in beverage can market.

In the organic resin covered metal sheet applied to the above-mentioned heavily formed use, a biaxially oriented film, which is manufactured by biaxial elongation of a thermoplastic polyester resin and subsequent heat-setting of it, is heat bonded to a metal sheet. The biaxial orientation of the film before heat bonding is partially or entirely lost from the contacting portion of the film to the metal sheet to the free surface (the surface not contacting to the metal sheet) in the thickness direction of the film by the heat conducted from the metal sheet when the film is heat bonded to the metal sheet. When the biaxial orientation of the film is totally lost after heat bonding, it causes the excellent adhesion between the film and the metal sheet for the above-mentioned heavily formed use, which is favorable for preventing peeling-off of the film and generation of film cracks during forming operation. On the other hand, the film without orientation has so large permeability that the content permeates the film and corrodes the metal substratum, and furthermore, it has faults that coarse spherlites are generated in the film by post heating during the operation of printing which shows the content or the like and cracks are easily caused in the film by falling of container or collision of each container.

Therefore, in the metal sheet covered with polyester resin film having biaxial orientation applied to the above-mentioned heavily formed use, the biaxial orientation of the film after the heat bonding is controlled to have formability compatible with permeation resistance and impact resistance (Laid open Japanese patent Hei 6-329669).

So far, copolyester resin obtained by copolymerization of ethylene terephthalate and ethylene isophthalate has been used in the organic resin covered metal sheet applied to the above-mentioned heavily formed use, and polyethylene terephthalate without copolymerized component has not been used in that field. The following is the reason. That is, copolyester resin obtained by copolymerization of ethylene terephthalate and ethylene isophthalate has small crystallization velocity, which undergoes little change of biaxial orientation by the temperature change of the metal sheet when a resin film is covered on a metal sheet by a heat bonding method consisting of contacting a resin film to a metal sheet heated to a temperature more than melting temperature of covering resin and pressing both, and it is rather easy to make biaxially oriented film structure having aforementioned formability compatible with permeation resistance and impact resistance by partially losing biaxial orientation before heat bonding as mentioned before. On the other hand, polyethylene terephthalate has large crystallization velocity, which causes extreme difficulty making biaxially oriented film structure having aforementioned formability compatible with permeation resistance and impact resistance by partially losing biaxial orientation before heat bonding when the film is covered on a metal sheet by heat bonding method. That is, as the biaxial orientation largely changes by a little temperature change of the metal sheet, it is extremely hard to make a prescribed film structure after covering. However, as copolyester resin has small crystallization velocity, it has a fault that crystal is apt to grow into coarse spherlite when it is post heated in the aforementioned printing operation or the like, which causes larger extent of deterioration of impact resistance. Furthermore, the price of copolyester resin film is high. Therefore, a polyester resin film of which film structure is easily made into favorable state after heat bonding as that of copolyester resin film and of which price is low is required.

THE OBJECTIVE OF THE PRESENT INVENTION

It is the objective of the present invention to produce a polyethylene terephthalate resin covered metal sheet having extremely excellent formability which can be applied to severely formed use such as drawing, drawing and ironing, drawing and stretch forming, or ironing after drawing and stretch forming.

THE METHOD TO REALIZE THE OBJECTIVE OF THE PRESENT INVENTION

Polyethylene terephthalate resin covered metal sheet of the present invention is one, wherein a biaxially oriented film consisting of polyethylene terephthalate having a low temperature crystallization temperature ranging from 130° to 165° C. is covered at least on one side of a metal sheet by heat bonding, which is characterized by that the low temperature crystallization temperature more preferably ranges from 140° to 150° C. It is further characterized by that the biaxial orientation of the polyethylene terephthalate resin film after being covered on the metal sheet by heat bonding is gradually increasing from the contacting portion of the film to the metal sheet to the surface portion of the film. And it is still further characterized by that the planar orientation coefficient of the film consisting of the polyethylene terephthalate resin after being covered on the metal sheet by heat bonding is ranging from 0 to 0.05 (referred as $n_1$) at the contacting portion of the film to the metal sheet and that is ranging from 0.03 to 0.15 (referred as $n_2$) at the surface portion of the film.

THE BEST MANNER TO PRACTICE THE PRESENT INVENTION

In the present invention, a film which is manufactured by biaxial elongation of poyethylene terephthalate resin having a low temperature crystallization temperature ranging 130° to 165° C., more preferably 140° to 155° C. is covered on a metal sheet by heat bonding consisting of contacting the resin film to one or either side of the metal sheet heated to a temperature more than melting temperature of the resin, inserting both into a couple of laminating roll, pressing both with the laminating roll, and quenching both immediately after that. The thus manufactured polyethylene terephthalate covered metal sheet can be applied to severely formed use because the biaxial orientation of the film is lost at the portion contacting to the metal sheet, which secures excellent adhesion of the film to the metal sheet, while the biaxial orientation remains higher at the nearer portion to the surface in the thickness direction of the film, which makes orientation structure of the film securing excellent permeation resistance and impact resistance.

EMBODIMENT

Hereinafter, the present invention is explained in detail referring embodiment.

At first, the polyethylene terephthalate resin composing the biaxially oriented film used in the present invention preferably has a low temperature crystallization temperature ranging 130° to 165° C., more preferably 140° to 155° C. A low temperature crystallization temperature is explained hereinafter. When an amorphous polyester resin such as polyethylene terephthalate which is obtained by heating it to a temperature more than melting temperature of it and quenching immediately after that is gradually heated using a differential scanning calorimeter, an exothermic peak appears in the temperature range of 100° to 200° C. depending resin composition. The resin of which exothermic peak appears in the higher temperature has a smaller crystallization velocity, while that appears in the lower temperature has a larger crystallization velocity. For example, the exothermic peak of polybutylene terephthalate resin on the market which is heat melted and subsequently quenched appears at about 50° C., while that of polyethylene terephthalate resin on the market which is heat melted and subsequently quenched appears at about 128° C. On the other hand, in case of ethylene terephthalate-ethylene isophthalate copolyester resin, which is used in a 2 piece can (a can of which body wall part and bottom part is formed in 1 piece) made of a metal sheet covered with a polyester resin film on the market, the exothermic peak appears at about 177° C.

In the present invention, a polyethylene terephthalate covered metal sheet having an orientation structure by which adhesion and formability are compatible with permeation resistance and impact resistance can be produced by heat bonding a biaxially oriented film consisting of polyethylene terephthalate resin having a low temperature crystallization temperature ranging 130° to 165° C. In case where a polyethylene terephthalate resin having a low temperature crystallization temperature less than 130° C., the crystallization velocity is large, which causes the great change of the biaxial orientation of the film by a slight change of the temperature of the metal sheet during the film covering process. Resultantly, the biaxial orientation widely varies in the film. When the biaxial orientation in the portion near the metal substratum is not lost enough, peeling-off of the film or origination of cracks in the film is caused in the forming of the polyethylene terephthalate resin covered metal sheet and as a result it can not be formed into a can. On the other hand, when the biaxial orientation is almost wholly lost in the entire film, the polyethylene terephthalate resin covered metal sheet can be formed into a can. However, when a content is packed in such a can and it is stored for a certain period of time, the content permeates the film and corrodes the metal substratum, or slight impact to the can causes cracks in the film. That is, When such a resin is used, the temperature range of a metal sheet to obtain a polyethylene terephthalate resin covered metal sheet having a favorable orientation structure of the film is so narrow that the operability is extremely poor.

On the other hand, it is extremely difficult in a sense of economy to manufacture a Homo polymer film consisting of polyethylene terephthalate resin having a low temperature crystallization temperature more than 165° C. alone. For this reason, a film having a low temperature crystallization temperature more than 165° C. can not but been manufactured by adding copolymerization component such as ethylene isophthalate. In case where this copolyester rein film having a small crystallization velocity is covered on a metal sheet under the conditions that formability is compatible with permeation resistance in the biaxially oriented film after covered on the metal sheet and thus obtained polyester resin covered metal sheet is formed into a can and subsequently heated, favorable impact resistance is hard to be obtained since the copolyester resin film itself is lacking in heat resistance.

The film used in the present invention consisting of polyethylene terephthalate having a low temperature crystallization temperature ranging 130° to 165° C. is essentially biaxially oriented in order to meet the above- mentioned characteristics necessary for a can formed of a metal sheet covered with this film. That is, the polyethylene terephthalate covered metal sheet of the present invention can be formed into a favorable can body and the formed can body can have favorable permeation resistance and impact resistance by changing the biaxial orientation of the film into a favorable orientated structure during heat bonding.

Furthermore, the thickness of the polyethylene terephthalate resin film is preferably 5 to 50 $\mu$ m, more preferably 10 to 30 $\mu$ m. When a film of which thickness is less than 5 $\mu$ m is heat bonded to a metal sheet, wrinkles are apt to be caused and it is extremely difficult to stably cover the film on the metal sheet. On the other hand, when using a film of which thickness is more than 50 $\mu$ m, the necessary characteristics can be attained but it is not profitable to economy.

A colored film, produced by adding color pigment into molten polyethylene terephthalate when the film is manufactured, can also be available.

Next, a metal sheet used for a polyethylene terephthalate covered metal sheet of the present invention will be explained. A surface treated strip or sheet of steel or aluminum alloy is used as a metal sheet. In case where a steel sheet is used, it is not necessary to define the chemical composition of the steel as far as the aforementioned severe forming can be practiced. The low carbon steel sheet having a thickness of 0.15 to 0.30 mm is preferably used. In order to produce excellent adhesion after forming of polyethylene terephthalate film to a steel sheet, it is more preferable to use a steel sheet having a coating of hydrated chromium oxide, a double layered coating consisting of a lower layer of metallic chromium and an upper layer of hydrated chromium oxide in particular, on the surface, that is tin free steel (TFS). And the steel sheet having a plating of one metal selected from tin, nickel or aluminum, a double layered plating or an alloy plating of more than one metal selected from those 3 metals, and further having the above-mentioned double layered coating is also available. In case where an aluminum alloy sheet is used, it is not necessary to define the chemical composition of the aluminum alloy as far as the aforementioned severe forming can be practiced as with the case of the steel. The aluminum alloy sheet of JIS 3000 series or 5000 series is preferably used with a view to economy and formability. It is more preferable to use an aluminum alloy sheet which is surface treated by known method such as the electrolytical treatment or the dipping treatment in the chromic acid solution, the etching in the alkali solution or acid solution, or the anodic oxidization. In case where the above-mentioned double layered coating consisting of a lower layer of metallic chromium and an upper layer of hydrated chromium oxide is formed on the sheet of steel or aluminum, the coating weight of the hydrated chromium oxide is preferably 3 to 50 mg/m2 as chromium, more preferably 7 to 25 mg/m2 as chromium, on the point of adhesion after forming of the covering resin film. It is unnecessary to define the coating weight of the metallic chromium, however, it is preferably 10 to 200 mg/m$^2$, more preferably 30 to 100 mg/m$^2$, on the point of corrosion resistance after forming and adhesion after forming of the covering resin film.

Further next, the covering method of the film of the present invention consisting of polyethylene terephthalate resin having low temperature crystallization temperature of 130° to 165° C. and biaxial orientation on the above-mentioned metal sheet by heat bonding will be explained below.

The covering method is consisting of heating a metal strip continuously supplied from a means of the metal strip supply to the temperature range above the melting temperature of the polyethylene terephthalate resin by a heating mean, contacting a biaxially oriented film of polyethylene terephthalate resin supplied from a means of the film supply on one side or both sides of the metal strip, putting them together between a couple of laminating roll, pinching and pressing them, and quenching immediately after that. In the series of these process, the film of polyethylene terephthalate resin is heated by heat conducted from the metal strip, the polyethylene terephthalate resin at the contacting portion with the metal strip melts, and the biaxial orientation of the film is more lost in the portion nearer to the contacting portion with the metal strip, while the biaxial orientation of the film is more retained in the portion nearer to the uppermost surface free from contacting with the metal strip since the uppermost surface of the film, opposite from the contacting surface with the metal strip, contacts to the laminating roll which cools the film. The orientation structure of the film after covered on the metal strip changes into more preferable one controlling the temperature of the metal strip and the laminating roll, and the period of time during the metal strip is contacting to the laminating roll, which corresponds to the feeding speed of the metal strip. The higher temperature of the metal strip and the laminating roll and the greater feeding speed of the metal strip, the greater the film is heated and the more the biaxial orientation of the whole film is lost.

In the covering method mentioned above, in case where the film having small crystallization speed is used, the resin amorphousized by heating after the lamination requires longer period of time for the recrystallization, which enables lengthen the period of time from the lamination to the quenching in proportion to the recrystallization speed of the resin, and thus the control of the orientation structure becomes relatively easier. On the other hand, in case where the film having great crystallization speed is used, the resin amorphousized resin rapidly recrystallizes after the lamination, which requires the quenching immediately after the lamination. As can easily be seen from the covering method mentioned above, it is impossible to shorten the period of time from the lamination to the quenching below a certain level, and the range of the covering process in which the orientation of the resin film can be controlled is extremely narrow, which troubles controlling the film orientation into the required state.

More further next, the orientation structure of the polyethylene terephthalate resin film after covered on the metal sheet of the present invention will be explained below. The biaxial orientation of the polyethylene terephthalate resin film after covered on the metal sheet is in the state that the biaxial orientation is more lost nearer to the contacting portion to the metal sheet and it is more retained nearer to the uppermost surface away from the metal sheet, since the biaxial orientation is destroyed by the heat conducted from the metal sheet when the polyethylene terephthalate resin film is contacted and bonded to the metal sheet heated above the melting temperature of the polyethylene terephthalate resin. In the metal sheet covered with polyethylene terephthalate resin film of the present invention, the orientation coefficient of the film portion directly contacting the metal sheet: $n_1$ and that at the uppermost surface of the film: $n_2$ are preferably 0 to 0.05 and 0.03 to 0.15, respectively. In case where the orientation coefficient of the film portion directly contacting the metal sheet: $n_1$ exceeds 0.05, the covered film is easily peeled off from the surface of the metal sheet which is formed into a can body by severe forming at the outside and the inside of the can body. As the film is not peeled off when the orientation coefficient is not more than 0.05, it should be controlled in the range of 0.05 or less. The polyethylene terephthalate resin at the portion directly contacting to the metal sheet, which is molten by heating, works the adhesion after forming. The orientation coefficient of 0 to 0.05 of the polyethylene terephthalate resin at this portion is enough for the outer side and the inner side of the can body. The measuring method of the orientation coefficient will be explained in detail later. The orientation coefficient that is determined by the measurement of refractive index is the average value measured at the portion from the lowermost surface of the film peeled off from the metal sheet to the portion 5 $\mu$m deep from the surface, which means that even if the orientation coefficient of the polyethylene terephthalate resin at the portion which had actually contacted to the metal sheet is 0, namely it has no orientation, it is exceeding 0 as far as the portion having orientation exists within 5 $\mu$m depth. The definition of $n_1$ as 0 to 0.05 in the resin covered metal sheet of the present invention results from the consideration mentioned above.

More further next, the orientation coefficient of the polyethylene terephthalate resin film at the uppermost surface n2 should be in the range of 0.03 to 0.15 from the view point of formability, permeation resistance and impact resistance of the polyethylene terephthalate resin covered metal sheet of the present invention.

In case where the orientation coefficient of the polyethylene terephthalate resin at the uppermost surface $n_2$ is less than 0.03, the permeation resistance of the resin layer itself to the content in the can remarkably deteriorates, which is unpreferable in particular at the surface to be the inner surface of the can directly contacting to the packed content. On the other hand, in case where the orientation coefficient exceeds 0.15, numerous cracks generates in the polyethylene terephthalate resin at the uppermost surface by severe forming and such a can not be a utility article, even if the orientation coefficient of the polyester resin portion directly contacting the metal sheet $n_1$ is less than 0.05. Accordingly, the orientation coefficient of the polyethylene terephthalate resin at the uppermost surface n 2 should be controlled in the range of 0.03 to 0.15.

The orientation coefficient of the polyethylene terephthalate resin film before the covering is also an important factor to produce a polyethylene terephthalate resin covered metal sheet. In case where the orientation coefficient exceeds 0.18, when the polyethylene terephthalate resin film is contacted and bonded to the metal sheet heated to a temperature above the melting temperature of the polyethylene terephthalate resin, it is extremely hard to control the orientation coefficient of the polyethylene terephthalate resin less than 0.15 at the uppermost surface portion and less than 0.05 at the portion where the polyethylene terephthalate resin directly contacts to the metal sheet. Therefore, the orientation coefficient of the polyethylene terephthalate resin film before the covering is preferably less than 0.18, more preferably nearly 0.17.

The orientation coefficient of the polyethylene terephthalate resin film before the covering, and $n_1$ and $n_2$ which are those at the portion where the resin film directly contacts to the metal sheet and at the uppermost surface after the covering, respectively, which are all important factors in the polyethylene terephthalate resin covered metal sheet of the present invention, can be determined by the following method. Namely, the orientation coefficient of the polyethylene terephthalate resin film for use is determined according to the next formula measuring the refractive indexes in the lengthwise direction, the widthwise direction and the thickness direction using Abbe's refractometer.

orientation coefficient=(A+B)/2−C

A: refractive index in the lengthwise direction
B: refractive index in the widthwise direction
C: refractive index in the thickness direction In case of the polyethylene terephthalate resin covered metal sheet, the resin covered metal sheet is immersed in the hydrochloric acid solution, the metal sheet surface is chemically dissolved, and only the polyethylene terephthalate resin film is peeled off, then followed by measuring the refractive indexes of the thus prepared resin film at the portion where the resin film directly contacted to the metal sheet and at the uppermost surface in the lengthwise, the widthwise and the thickness directions in the same manner as mentioned above, and then determining the orientation coefficient according to the above-mentioned formula.

In the polyethylene terephthalate resin covered metal sheet of the present invention, the orientation coefficient of the covered resin film shows the degree of the crystalline orientation of the polyethylene terephthalate resin film, however, it is impossible to determine the orientation coefficient of the optically opaque film added by the pigment or the like into the resin. In such a case, it can be determined using X ray diffraction method, IR (infrared ray) method or the like.

The degree of orientation of the polyethylene terephthalate resin film can be determined by the measurement of the X ray diffraction intensity of (100) plane as an index, namely the X ray diffraction intensity of (100) plane in case of the diffraction angle 2θ=26°. The X ray diffraction intensity has correlation with the orientation coefficient. Therefore, the preparation of the correlation between the X ray diffraction intensity and the orientation coefficient in the resin film having the same chemical composition without pigment enables to determine the degree of the crystalline orientation measuring the X ray diffraction intensity of (100) plane, even if the resin film is pigmented one.

The measurement of the degree of the crystalline orientation of the covered polyethylene terephthalate resin film at the portion nearly 5 μm deep from the uppermost surface can be practiced setting the permeation depth of X ray penetrating into the polyethylene terephthalate resin film to 5 μm in the measurement of the degree of the crystalline orientation by the above-mentioned X ray diffraction method. A thin film X ray diffractometer makes the measurement easy. Namely, X ray is projected at the low angle of incidence to the covered polyethylene terephthalate resin film. The fixation of diffraction angle 2θ to 26° enables to determine the crystalline orientation at the (100)plane of the uppermost surface of the covered polyethylene terephthalate resin film. However, the preparation of the correlation between the X ray diffraction intensity and the orientation coefficient in the resin film having the same chemical composition without pigment is also required. Further, in the present invention, the thermosetting resin such as the epoxy resin can be intervened between the polyethylene terephthalate resin film and the metal sheet when the resin film is heat bonded to the metal sheet.

The present invention will be explained more in detail below referring to the examples.

EXAMPLE

The biaxially oriented film having thickness of 25 μm produced from polyethylene terephthalate resins (shown as PET in Tables) having various low temperature crystallization temperature shown in Table 1 to 2 and copolyester resin consisting of 88 mole % of ethylene terephthalate and 12 mole % of ethylene isophthalate (shown as PETI in Tables) were covered by the heat bonding on the conditions shown in Table 1 on both sides of TFS (metallic chromium : 110 mg/m2 and hydrated chromium oxide: 14 mg/m2 as chromium) of Temper DR-10 having thickness of 0.18 mm. The orientation coefficient of the resin at the portion where the resin film directly contacted to the metal sheet and at the uppermost surface on both sides of the thus produced resin covered metal sheets were measured, and then the resin covered metal sheets were formed using method described below.

At first, the resin covered metal sheets were punched out into circular blanks having a diameter of 160 mm and then they were formed into drawn cans having a diameter of 100 mm. After that, they were formed into redrawn cans having a diameter of 80 mm by redrawing. These redrawn cans were formed into drawn and stretch formed and ironed cans having a diameter of 66 mm by a composite forming consisting of simultaneous drawn and stretch forming and ironing. This composite forming was practiced on the conditions that the clearance between drawing portion, which corresponds to the upper edge part of the can, and ironing portion was 20 mm, curvature radius in a corner of dies for redrawing process was 1.5 times of the thickness of the resin covered metal sheet, the clearance between the redrawing dies and the punch was 1.0 time of the thickness of the resin covered metal sheet, and the clearance between the ironing portion of the redrawing dies and the punch was 50% of the thickness of the resin covered metal sheet. After that, the upper edge part of the can was trimmed off by a known method, then they were practiced by necked-in forming and flange forming. The peeling-off of the resin layer at the wall portion of the thus produced can body was evaluated by the method described below. And further, the impact resistance of the resin film on the inside of the can body was evaluated by the method described below after baking at 220° C. for 30 seconds for that produced from the polyethylene terephthalate resin covered metal sheet and at 210° C. for 30 seconds for that produced from the copolyester resin covered metal sheet.

(I) Peeling-off of the resin layer from the can wall portion

The degree of peeling-off of the resin layer from the can wall portion of the inside and outside of the produced can body was observed by the naked eye and evaluated based on the following standard.

⊚: no peeling-off

○: slightly peeled off but no problem for practical use

Δ: heavily peeled off

X: peeled off at the whole upper portion of the can body (II) Impact resistance of the resin film on the inside of the can body At first, water was packed in the produced can and the rid was corked. Then, the can was fallen on the bottom down from a height of 15 cm. After it was opened and the water was taken out, 3% sodium chloride solution was packed and a rod of stainless steel as a cathode was immersed in it. After that, a voltage about 6.3 volts was charged between the cathode and the can body as an anode. In case where even if the metal substratum under the resin layer is slightly exposed, a current flows. The degree of the metal expose was evaluated by the current value (mA). The results of the evaluation were shown in Table 3 to 4 in accompany with the orientation coefficient of the film of the resin covered metal sheet measured before the forming.

TABLE 1

Characteristics of polyester resins and laminating conditions (1)

| | Resin film | | Covering conditions of resin film | | | |
|---|---|---|---|---|---|---|
| Sample number | Resin composition | L.T.C.* temperature (° C.) | Heating temperature of metal sheet (° C.) | Supply speed of metal sheet (m/min) | Temperature of laminating (° C.) | Period of time from lamination to quenching (second) |
| 1 | PET | 128 | 280 | 200 | 150 | 0.5 |
| 2 | PET | 128 | 290 | 200 | 150 | 0.5 |
| 3 | PET | 128 | 300 | 200 | 150 | 0.5 |
| 4 | PET | 130 | 270 | 200 | 150 | 0.5 |
| 5 | PET | 130 | 280 | 200 | 150 | 0.5 |
| 6 | PET | 130 | 290 | 200 | 150 | 0.5 |
| 7 | PET | 140 | 270 | 200 | 150 | 0.5 |
| 8 | PET | 140 | 280 | 200 | 150 | 0.5 |
| 9 | PET | 140 | 290 | 200 | 150 | 0.5 |

Remarks: L.T.C.* Low temperature crystallization

TABLE 2

Characteristics of polyester resins and laminating conditions (2)

| | Resin film | | Covering conditions of resin film | | | |
|---|---|---|---|---|---|---|
| Sample number | Resin composition | L.T.C.* temperature (° C.) | Heating temperature of metal sheet (° C.) | Supply speed of metal sheet (m/min) | Temperature of laminating (° C.) | Period of time from lamination to quenching (second) |
| 10 | PET | 155 | 270 | 200 | 150 | 0.5 |
| 11 | PET | 155 | 280 | 200 | 150 | 0.5 |
| 12 | PET | 155 | 290 | 200 | 150 | 0.5 |
| 13 | PET | 165 | 270 | 200 | 150 | 0.5 |
| 14 | PET | 165 | 280 | 200 | 150 | 0.5 |
| 15 | PET | 165 | 290 | 200 | 150 | 0.5 |
| 16 | PETI | 177 | 235 | 200 | 150 | 0.5 |
| 17 | PETI | 177 | 245 | 200 | 150 | 0.5 |
| 18 | PETI | 177 | 255 | 200 | 150 | 0.5 |

Remarks: L.T.C.* Low temperature crystallization

TABLE 3

Evaluation result of characteristics of resin covered metal sheet (1)

| | Orientation coefficient of film before covering | Orientation coefficient of film after covering | | Evaluation of covered metal sheet | | |
|---|---|---|---|---|---|---|
| Sample number | | contacting side with metal sheet ($n^1$) | uppermost surface side ($n^2$) | Peeling-off of film (by naked eye) | Impact resistance (mA) | Item |
| 1 | 0.1721 | 0.078 | 0.158 | X | 0.00 | Comp. Ex.[#] |
| 2 | 0.1721 | 0.041 | 0.112 | Δ | 0.02 | Comp. Ex.[#] |
| 3 | 0.1721 | 0.009 | 0.067 | ⊚ | 0.69 | Comp. Ex.[#] |

TABLE 3-continued

Evaluation result of characteristics of resin covered metal sheet (1)

| Sample number | Orientation coefficient of film before covering | Orientation coefficient of film after covering | | Evaluation of covered metal sheet | | Item |
| --- | --- | --- | --- | --- | --- | --- |
| | | contacting side with metal sheet ($n^1$) | uppermost surface side ($n^2$) | Peeling-off of film (by naked eye) | Impact resistance (mA) | |
| 4 | 0.1158 | 0.028 | 0.076 | ○ | 0.00 | Example |
| 5 | 0.1158 | 0.013 | 0.046 | ⊚ | 0.00 | Example |
| 6 | 0.1158 | 0.005 | 0.032 | ⊚ | 0.04 | Example |
| 7 | 0.1107 | 0.024 | 0.071 | ○ | 0.00 | Example |
| 8 | 0.1107 | 0.011 | 0.042 | ⊚ | 0.00 | Example |
| 9 | 0.1107 | 0.004 | 0.030 | ⊚ | 0.02 | Example |

Remarks: Comp. Ex.# Comparative Example

TABLE 4

Evaluation result of characteristics of resin covered metal sheet (2)

| Sample number | Orientation coefficient of film before covering | Orientation coefficient of film after covering | | Evaluation of covered metal sheet | | Item |
| --- | --- | --- | --- | --- | --- | --- |
| | | contacting side with metal sheet ($n^1$) | uppermost surface side ($n^2$) | Peeling-off of film (by naked eye) | Impact resistance (mA) | |
| 1 | 0.1123 | 0.024 | 0.070 | ○ | 0.00 | Example |
| 2 | 0.1123 | 0.011 | 0.052 | ⊚ | 0.00 | Example |
| 3 | 0.1123 | 0.004 | 0.039 | ⊚ | 0.00 | Example |
| 4 | 0.1158 | 0.021 | 0.067 | ○ | 0.00 | Example |
| 5 | 0.1158 | 0.009 | 0.043 | ⊚ | 0.01 | Example |
| 6 | 0.1158 | 0.002 | 0.031 | ⊚ | 0.07 | Example |
| 7 | 0.1223 | 0.041 | 0.112 | Δ | 0.00 | Comp. Ex.# |
| 8 | 0.1223 | 0.011 | 0.074 | ⊚ | 0.23 | Comp. Ex.# |
| 9 | 0.1223 | 0.009 | 0.067 | ⊚ | 0.83 | Comp. Ex.# |

Remarks: Comp. Ex.# Comparative Example

As can be seen in Table 3 to 4, the metal sheet covered with a polyethylene terephthalate resin film having a low temperature crystallization temperature of 130° to 165° C. of the present invention is superior in the adhesion after forming and the impact resistance to a metal sheet covered with a polyethylene terephthalate resin film having a low temperature crystallization temperature lower than that of the present invention or that covered with a polyester resin film having a low temperature crystallization temperature higher than that of the present invention.

EFFECT OF INVENTION

In the polyethylene terephthalate resin covered metal sheet of the present invention, a biaxially oriented film consisting of polyethylene terephthalate resin having a low temperature crystallization temperature ranging from 130° to 165° C. is covered at least on one side of a metal sheet by heat bonding, and the biaxial orientation of the film of the polyethylene terephthalate resin after being covered on said metal sheet is gradually increasing from the contacting portion of the film to said metal sheet to the surface portion of the film, and further a planar orientation coefficient of said film consisting of said polyethylene terephthalate resin after being covered on said metal sheet is ranging from 0 to 0.05 ($n_1$) at the contacting portion of said film to said metal sheet and that is ranging from 0.03 to 0.15 ($n_2$) at the surface portion of said film. Therefore, the adhesion and the formability can be compatible with the permeation resistance and the impact resistance in the resin covered metal sheet of the present invention, and it can be available for uses in which severe forming is practiced such as drawing, drawing and ironing and drawn and stretch forming as well as the composite forming consisting of drawn and stretch forming followed by ironing.

What is claimed is:

1. Polyethylene terephthalate resin covered metal sheet, wherein a biaxially oriented film consisting of polyethylene terephthalate having a low temperature crystallization temperature ranging from 130° to 165° C. is covered at least on one side of a metal sheet by heat bonding.

2. Polyethylene terephthalate resin covered metal sheet according to claim 1, wherein a low temperature crystallization temperature ranges from 140° to 150° C.

3. Polyethylene terephthalate resin covered metal sheet according to claim 1, wherein a biaxial orientation of a film of said polyethylene terephthalate resin after being covered on said metal sheet by heat bonding is gradually increasing from the contacting portion of said film to said metal sheet to the surface portion of said film.

4. Polyethylene terephthalate resin covered metal sheet according to 3, wherein a planar orientation coefficient of said film consisting of polyethylene terephthalate resin after being covered on said metal sheet by heat bonding is ranging from 0 to 0.05 (hereinafter referred as $n_1$) at the contacting portion of said film to said metal sheet and that is ranging from 0.03 to 0.15 (hereinafter referred as $n_2$) at the surface portion of said film.

5. Polyethylene terephthalate resin covered metal sheet, wherein a biaxially oriented film consisting of polyethylene terephthalate having a low temperature crystallization temperature ranging from 130° to 165° C. is covered at least on one side of a metal sheet by heat bonding, and a biaxial orientation of said film of polyethylene terephthalate resin, after being covered on said metal sheet by heat bonding, is gradually increasing from the contacting portion of said film to said metal sheet to the surface portion of said film.

6. Polyethylene terephthalate resin covered metal sheet according to claim 5, wherein a low temperature crystallization temperature ranges from 140° to 150° C.

7. Polyethylene terephthalate resin covered metal sheet according to claim 5, wherein a biaxially oriented film consisting of polyethylene terephthalate having a low temperature crystallization temperature ranging from 130° to 165° C. is covered at least on one side of a metal sheet by heat bonding, and a planar orientation coefficient of said film, consisting of polyethylene terephthalate resin, after being covered on said metal sheet by heat bonding, ranges from 0 to 0.05 (hereinafter referred as $n_1$) at the contacting portion of said film to said metal sheet and ranges from 0.03 to 0.15 (hereinafter referred as $n_2$) at the surface portion of said film.

8. Polyethylene terephthalate resin covered metal sheet according to claim 7, wherein a low temperature crystallization temperature ranges from 140° to 150° C.

* * * * *